United States Patent
Hara et al.

(10) Patent No.: US 11,082,133 B2
(45) Date of Patent: Aug. 3, 2021

(54) OPTICAL MODULATION/DEMODULATION METHOD, OPTICAL COMMUNICATION SYSTEM, OPTICAL TRANSMITTING DEVICE AND OPTICAL RECEIVING DEVICE

(71) Applicant: NIPPON TELEGRAPH AND TELEPHONE CORPORATION, Tokyo (JP)

(72) Inventors: Kazutaka Hara, Musashino (JP); Kazuaki Honda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/980,181

(22) PCT Filed: Mar. 13, 2019

(86) PCT No.: PCT/JP2019/010150
§ 371 (c)(1),
(2) Date: Sep. 11, 2020

(87) PCT Pub. No.: WO2019/176978
PCT Pub. Date: Sep. 19, 2019

(65) Prior Publication Data
US 2021/0013971 A1    Jan. 14, 2021

(30) Foreign Application Priority Data
Mar. 16, 2018 (JP) .............................. JP2018-049089

(51) Int. Cl.
*H04B 10/25* (2013.01)
*H04B 10/54* (2013.01)
(Continued)

(52) U.S. Cl.
CPC .......... *H04B 10/541* (2013.01); *H04B 10/25* (2013.01); *H04B 10/69* (2013.01); *H04L 7/0075* (2013.01)

(58) Field of Classification Search
CPC ...... H04B 10/541; H04B 10/69; H04B 10/25; H04L 7/0075
See application file for complete search history.

(56) References Cited

U.S. PATENT DOCUMENTS 5,510,919 A * 4/1996 Wedding ................ H04B 10/50
375/287
2008/0112885 A1* 5/2008 Okunev ............... A61B 5/0022
424/9.1
(Continued)

FOREIGN PATENT DOCUMENTS

EP    1420532 A1    5/2004
JP    H05206985 A    8/1993

OTHER PUBLICATIONS

John Van Weerdenburg, Roland Ryf, Juan Carlos Alvarado-Zacarias, Roverto A. Alvarez-Aguirre, Nicholas K. Fontaine, Haoshuo Chen, Rodrigo Amezcua-Correa, Ton Koonen, Chigo Okonkwo. "138 Tbit/s Transmission over 650 km Graded-Index 6-Mode Fiber." Th.PDP.A.4.Proc ECOC2017. Sep. 17, 2017.
(Continued)

*Primary Examiner* — Dzung D Tran

(57) ABSTRACT

An object is to provide an optical modulation/demodulation method, an optical communication system, an optical transmitting device, and an optical receiving device capable of inhibiting an increase in the cost and a decrease in the band at the time of multiplexing services. The optical transmitting device according to the present invention sums a plurality of binary signals that have bit rates having such relation that the bit rate of any higher speed side is twice or more integer multiples of a bit rate of any lower speed side, having
(Continued)

smaller amplitude as the corresponding bit rate becomes higher and having matched rise and fall timings, and generates a multi-level signal, and modulates light from one light source. In other words, generating a multi-level signal as a modulation signal enables a plurality of services to be multiplexed by one transmitter. The optical receiving device according to an aspect of the present invention sets a plurality of thresholds that can be used for identifying all the amplitude values of the multi-level signal for an optical signal that is service-multiplexed by the optical transmitting device described above and compares an amplitude of the multi-level signal acquired by performing photoelectric conversion of the received optical signal with the plurality of thresholds. The optical receiving device determines bits of the multiplexed binary signal on the basis of a result of the comparison.

7 Claims, 8 Drawing Sheets

(51) Int. Cl.
*H04B 10/69* (2013.01)
*H04L 7/00* (2006.01)

(56) References Cited

U.S. PATENT DOCUMENTS

2014/0119486 A1* 5/2014 Mendel ............... H04L 25/08
375/353
2014/0270000 A1* 9/2014 Liu ...................... H04L 1/0047
375/320
2016/0269810 A1* 9/2016 Chow .................. H04B 10/272

OTHER PUBLICATIONS

T. Kobayashi, M. Nakamura, F. Hamaoka, K. Shibahara, T. Mizuno, A. Sano, H. Kawakami, A. Isoda, M. Nagatani, H. Yamazaki, Y. Miyamoto, Y. Amma, Y. Sasaki, K. Takenaga, K. Aikawa, K. Saitoh, Yong-min Jung, D.J. Richardson, K. Pulverer, M. Bohn, Md. Noruzzaman, T. Morioka. "1-Pb/s (32 SDM/46 WDM/768 Gb/s) C-band dense SDM transmission over 205.6-km of single-mode heterogeneous multi-core fiber using 96-Gbaud PDM-16QAM channels." Th5B.1.Proc OFC2017. Mar. 19, 2017.

Giuseppe Talli, Stefano Porto, Daniel Carey, Nicola Brandonisio, Alan Naughton, Peter Ossieur, Paul Townsend, Rene Bonk, Thomas Pfeiffer, Frank Slyne, Seamas McGettrick, Christian Blümm, Marco Ruffini, Alan Hill, David Payne, Nick Parsons. "Multi-service SDN controlled reconfigurable long-reach optical access network." WON1, Proc EuCNC2017. Jun. 12, 2017.

Yumiko Senoo, Tomoaki Yoshida, Shin Kaneko, Jun Sugawa, Koji Wakayama, Shunji Kimura, Ken Ichi Suzuki, Akihiro Otaka. "512-ONU real-time dynamic load balancing with few wavelength reallocations in 40 Gbps λ—Tunable WDM/TDM-PON." IEEE/OSA Journal of Optical Communications and Networking, vol. 7, Issue 12, 2015, pp. B202-B211.

Heinz G. Krimmel, Wolfgang Poehlmann, Bernard Deppisch, Lothar Jentsch, Thomas Pfeiffer. "10 Gpbs/2.5 Gpbs GPON Coexistence by Downstream Bit-Stacking." ECOC 2008. Sep. 21, 2008.

* cited by examiner

OPTICAL MODULATION/DEMODULATION METHOD, OPTICAL COMMUNICATION SYSTEM, OPTICAL TRANSMITTING DEVICE AND OPTICAL RECEIVING DEVICE

CROSS-REFERENCE TO RELATED APPLICATIONS

This application is a 371 U.S. National Phase of International Application No. PCT/JP2019/010150, filed on Mar. 13, 2019, which claims priority to Japanese Application No. 2018-049089 filed on Mar. 16, 2018. The entire disclosures of the above applications are incorporated herein by reference.

TECHNICAL FIELD

The present disclosure relates to an optical modulation/demodulation method, an optical communication system, an optical transmitting device, and an optical receiving device that multiplex signals having different bit rates.

BACKGROUND ART

High-speed Internet services using Fiber-To-The-Home (FTTH) and Long Term Evolution (LTE) have become essential tools for daily life. Particularly, in recent years, requirements for accelerated networks have further increased in accordance with widespread use of clouds and an increase in use of mobile terminals. In particular, technologies for acceleration of core/metropolitan networks, optical transmission of 138 Tbits/s over 650 km for 120 wavelengths (wavelength division multiplexed (WDM) signals) using six modes, two orthogonal polarized states, and modulation of 16 orthogonal phases/amplitudes has been reported to be successful in NPL 1. In NPL 2, transmission of 1 Pbits/s and 205.6 km for 46 WDM signals using 32 multi-core fibers, two orthogonal polarized states, and modulation of 16 orthogonal phases/amplitudes has been reported. In this way, the recent trend of technologies for acceleration in core/metro networks is characterized by a method that achieves a high speed by using a frequency (wavelength), polarization, a phase, which are physical quantities of light, and mode states of light and forming a multi-core optical fiber for a medium.

On the other hand, for an access network from a communication company accommodation station to a subscriber's home, in order to house subscribers extending in a plane efficiently and economically, a time division multiplexing passive optical network (TDM-PON) systems in which fibers and devices are shared by multiplexing a termination device (an optical line terminal (OLT)) installed in an accommodation station of a communication company and a subscriber device (an optical network unit (ONU)) installed in a subscriber's home on a time axis using optical multiplexing/splitting devices such as an optical splitter and the like are mainly used. For accelerating a TDM-based PON system, although one gigabit-Ethernet PON (G-EPON) of 1 Gbit/s is currently being used in this country, reviews of 10 G-EPON realizing a 10 times more throughput and, currently, ultra high speed PON systems of classes of 40 Gbits/s and 100 Gbits/s extending the band according to a combination with WDM have been actively discussed in standardization organizations such as the IEEE and ITU-T and international conferences. In addition, in recent years, in view of the background in which not only network acceleration but also a wide variety of applications and services such as the Internet of Things (IOT), high definition video delivery services, video uploading, and the like have become widespread and are being widely used, there has been a trend of increasing research and developments in PONs that economically implement multiple services by optimally combining a time axis and a wavelength axis, as described in NPLs 1, 3 and 4.

CITATION LIST

Patent Literature

PTL 1: Japanese Unexamined Patent Application Publication No. JP 05-206985 A

Non Patent Literature

NPL 1: John Van Weerdenburg, Roland Ryf, Juan Carlos Alvarado-Zacarias, Roberto A. Alvarez-Aguirre, Nicolas K. Fontaine, Haoshuo Chen, Rodrigo Amezcua-Correa, Ton Koonen, and Chigo Okonkwo, "138 Tbit/s Transmission over 650 km Graded-Index 6—Mode Fiber", Th.PDP.A.4, Proc ECOC2017

NPL 2: T. Kobayashi, M. Nakamura, F. Hamaoka, K. Shibahara, T. Mizuno, A. sano, H. Kawakami, A. Isoda, M. Nagatani, H. Yamazaki, Y. Miyamoto, Y. Amma, Y. Sasaki, K. Takenaga, K. Aikawa, K. Saitoh, Yong-min Jung, D. J. Richardson, K. Pulverer, M. Bohn, Md. Nooruzzaman, and T. Morioka, "1—Pb/s (32 SDM/46 WDM/768 Gb/s) C-band Dense SDM Transmission over 205.6—km of Single-mode Heterogeneous Multi-core Fiber using 96—Gbaud PDM—16 QAM Channels", Th5B.1, Proc OFC2017

NPL 3: G. Talli, S. Porto, D. Carey, N. Brandonisio, A. Naughton, P. Ossieur, P. Townsend, R. Bonk, T. Pfeiffer, F. Slyne, S. McGettrick, C. Blumm, M. Ruffini, A. Hill, D. Payne, N. Parsons, "Multi-service SDN controlled reconfigurable long-reach optical access network", WON1, Proc EuCNC2017

NPL 4: Y. Senoo, T. Yoshida, S. Kaneko, J. Sugawa, K. Wakayama, S. Kimura, K. Suzuki, and A. Otaka, "512—ONU Real-Time Dynamic Load Balancing With Few Wavelength Reallocations in 40 Gbps λ-Tunable WDM/TDM-PON", IEEE/OSA Journal of Optical Communications and Networking, Vol. 7, Issue 12, pp. B202-B211, 2015.

SUMMARY OF THE INVENTION

Technical Problem

While "economy" is emphasized in access networks as described above, modulation/demodulation technologies using a phase and a polarized state used in core/metro networks requires high-priced optical transmitters and optical receivers. Thus, a direct detection system in which intensity modulation of performing modulation by turning on/off an amplitude component of light is used, and light is received using a photo-diode (PD) having a band matching a modulation speed thereof is mainly employed.

In addition, in order to economically realize multiple services in a PON system, a bit rate or a band that is optimal is expected to be different for each service or application. Thus, a method of multiplexing on a time axis or a method of multiplexing on a wavelength axis by performing intensity modulation for each bit rate is generally used. FIG. 1 illustrates a PON system that accommodates multiple services on a time axis (time division multiplexing: TDM). Reference signs represented in the drawing are as below. Reference sign 1 is an OLT installed at an accommodation station of a communication company, reference sign 1A is an optical transmitter installed inside the OLT, reference signs 2A-1 to 2A-n are n subscriber devices ONU, reference sign 3A is an optical splitter of n:1, reference sign 4A is a main subscriber optical fiber line, reference sign 5A is n branch subscriber optical fiber lines, and reference sign 6A is a timing chart in a downlink direction. A band of the optical transmitter 1A is selected for a service requiring a highest bit rate among services A to N, a frame is transmitted by the TDM, and each ONU discards frames other than its own frame, whereby services having different bit rates can be economically accommodated in the PON. Here, n and N are integers that are equal to or larger than two.

FIG. 2 illustrates a PON system that realizes multiple services on a wavelength axis (wave division multiplexing: WDM). Some reference signs in the drawing are the same as those represented in FIG. 1. This system realizes multiple services by assigning different wavelengths to respective services. Reference signs 1B-1 to 1B-n are n transmitters that output light having wavelengths $\lambda 1$ to $\lambda n$, reference sign 2B is an optical multiplexer that multiplexes the wavelengths $\lambda 1$ to $\lambda n$, reference signs 3B-1 to 3B-n are WDM filters that respectively transmit specific wavelengths, and reference sign 6B is a timing chart in a downlink direction. The optical transmitters 1B-1 to 1B-n installed on the OLT side output respective optical signals having different wavelengths modulated with bit rates corresponding to services, and the ONUs include respective WDM filters 3B-1 to 3B-n that transmit wavelengths corresponding to the services, whereby multiple services having different bit rates can be accommodated in the PON.

In the TDM system illustrated in FIG. 1, services are multiplexed through time division with the same wavelength, and thus only one transmitter is necessary. However, in the TDM system, sharing a transmission band for a plurality of services (N in FIG. 1) causes a band per unit time of a specific service to become 1/N, and thus there is a problem in that the band expansion is difficult due to a multiplexing number.

On the other hand, in the WDM system illustrated in FIG. 2, a different wavelength is assigned to each service, and thus, a band-occupying type service can be provided. However, because the WDM system requires a transmitter having a different wavelength for each service, the cost of the transmitter becomes N times as large as that of the case illustrated in FIG. 1, and there is a problem in that the cost reduction is difficult.

Although PTLs 1, 3, and 4 propose methods for realizing multiple services using a hybrid system of the TDM and the WDM, when the number of used wavelengths, in other words, the number of transmitters is M (here, M is an integer, and M<N), a band occupied by a specific service becomes M/N, and the cost of the transmitters becomes M times as large as that of the case illustrated in FIG. 1. Thus, the method cannot solve the fundamental issue.

In order to solve the problems described above, an object of the present invention is to provide an optical modulation/demodulation method, an optical communication system, an optical transmitting device, and an optical receiving device capable of inhibiting an increase in the cost and a decrease in the band at the time of multiplexing services.

Means for Solving the Problem

In order to achieve the objects described above, an optical modulation/demodulation method according to an embodiment of the present invention economically realizes multiple services of a band occupying type by employing a simple configuration using one transmitter under a condition that bit rates of a plurality of services having different bit rates are integer multiples.

More specifically, an optical transmitting device according to an aspect of the present invention includes: a modulator that sums a plurality of binary signals having bit rates that are twice or more integer multiples of a bit rate of a low-speed side and having frequencies synchronized with each other with each amplitude further decreasing as the corresponding bit rate becomes higher, and generates a modulation signal representing a combination of bits of the plurality of binary signals as an amplitude value, and an optical transmitter that transmits an optical signal amplitude-modulated using the modulation signal generated by the modulator.

An optical transmitting device sums a plurality of binary signals that have bit rates having such relation that the bit rate of any higher speed side is twice or more integer multiples of a bit rate of any lower speed side, having smaller amplitude as the corresponding bit rate becomes higher and having matched rise and fall timings, and generates a multi-level signal, and modulates light from one light source. In other words, generating a multi-level signal as a modulation signal enables a plurality of services to be multiplexed by one transmitter. Thus, the present invention can provide an optical transmitting device capable of inhibiting an increase in the cost and a decrease in the band at the time of multiplexing services.

In addition, an optical receiving device according to an aspect of the present invention includes:

an optical receiver that performs photoelectric conversion of an optical signal amplitude-modulated using a modulation signal representing a combination of bits of a plurality of binary signals as an amplitude value by summing a plurality of binary signals having bit rates that are twice or more integer multiples of a bit rate of a low-speed side and having frequencies synchronized with each other with each amplitude further decreasing as the corresponding bit rate becomes higher, and generates a reception signal corresponding to a modulation signal, and a frequency splitter that determines the combination of the bits of the plurality of binary signals by identifying all the amplitude values included in the reception signal using thresholds smaller than the number of the combinations of the bits of the plurality of binary signals by one and identifies the bits of the plurality of binary signals summed.

This optical receiving device sets a plurality of thresholds that can be used for identifying all the amplitude values of a multi-level signal for an optical signal that has been service-multiplexed by the optical transmitting device described above and compares the amplitude of the multi-level signal acquired by performing photoelectric conversion of the received optical signal with the plurality of thresholds. The optical receiving device determines bits of the multiplexed binary signal on the basis of a result of the comparison. Thus, the present invention can provide an optical receiving device capable of inhibiting an increase in the cost and a decrease in the band at the time of multiplexing services.

Another optical receiving device according to an aspect of the present invention includes an optical receiver that performs photoelectric conversion of an optical signal amplitude-modulated using a modulation signal representing a combination of bits of a plurality of binary signals as an amplitude value by summing a plurality of binary signals having bit rates that are twice or more integer multiples of a bit rate of a low-speed side and having frequencies synchronized with each other with each amplitude further decreasing as the corresponding bit rate becomes higher, and generates a reception signal corresponding to a modulation signal, and a frequency splitter that generates a low-speed side signal by transmitting a low-speed side of the reception signal through a low pass filter, and separates the plurality of binary signals from the reception signal by subtracting the low-speed side signal from the reception signal.

This optical receiving device extracts multiplexed binary signals by performing calculation using an analog circuit without using thresholds. Thus, the present invention can provide an optical receiving device capable of inhibiting an increase in the cost and a decrease in the band at the time of multiplexing services.

By using the optical transmitting device and the optical receiving device according to the present invention, a modulation/demodulation system economically, for a plurality of services having different bit rates, realizing multiple services of a band occupying type by employing a simple configuration using one transmitter under a condition that the bit rates are integer multiples and a PON system using the modulation/demodulation system described above can be provided.

In other words, an optical modulation/demodulation method according to an aspect of the present invention includes a transmitting step of summing the plurality of binary signals having bit rates that are twice or more integer multiples of a bit rate of a low-speed side and having frequencies synchronized with each other with each amplitude further decreasing as the corresponding bit rate becomes higher, generating a modulation signal representing a combination of bits of the plurality of binary signals as an amplitude value, and transmitting an optical signal amplitude-modulated using the modulation signal; and a receiving step of performing photoelectric conversion of the optical signal transmitted in the transmitting step, generating a reception signal corresponding to the modulation signal, determining the combination of the bits of the plurality of binary signals by identifying all the amplitude values included in the reception signal using thresholds smaller than the number of the combinations of the bits of the plurality of binary signals by one, and identifying the bits of the plurality of binary signals summed.

An optical communication system according to an aspect of the present invention include a transmission circuit configured to sum a plurality of binary signals having bit rates that are twice or more integer multiples of a bit rate of a low-speed side and having frequencies synchronized with each other with each amplitude further decreasing as the corresponding bit rate becomes higher, generate a modulation signal representing a combination of bits of the plurality of binary signals as an amplitude value, and transmit an optical signal amplitude-modulated using the modulation signal; and a reception circuit configured to perform photoelectric conversion of the optical signal transmitted in the transmitting step, generate a reception signal corresponding to the modulation signal, determine the combination of the bits of the plurality of binary signals by identifying all the amplitude values included in the reception signal using thresholds smaller than the number of the combinations of the bits of the plurality of binary signals by one, and identify the bits of the plurality of binary signals summed.

In addition, another optical modulation/demodulation method according to an aspect of the present invention includes a transmitting step of summing a plurality of binary signals having bit rates that are twice or more integer multiples of a bit rate of a low-speed side and having frequencies synchronized with each other with each amplitude further decreasing as the corresponding bit rate becomes higher, generating a modulation signal representing a combination of bits of the plurality of binary signals as an amplitude value, and transmitting an optical signal amplitude-modulated using the modulation signal; and a receiving step of performing photoelectric conversion of the optical signal transmitted in the transmitting step, generating a reception signal corresponding to the modulation signal, generating a low-speed side signal by transmitting a low-speed side of the reception signal through a low pass filter, and separating the plurality of binary signals from the reception signal by subtracting the low-speed side signal from the reception signal.

Another optical communication system according to an aspect of the present invention includes a transmission circuit configured to sum a plurality of binary signals having bit rates that are twice or more integer multiples of a bit rate of a low-speed side and having frequencies synchronized with each other with each amplitude further decreasing as the corresponding bit rate becomes higher, generate a modulation signal representing a combination of bits of the plurality of binary signals as an amplitude value and transmit an optical signal amplitude-modulated using the modulation signal; and a reception circuit configured to perform photoelectric conversion of the optical signal transmitted in the transmitting step, generate a reception signal corresponding to the modulation signal, generate a low-speed side signal by transmitting a low-speed side of the reception signal through a low pass filter, and separate the plurality of binary signals from the reception signal by subtracting the low-speed side signal from the reception signal.

Effects of the Invention

As described above, according to the disclosure, an optical modulation/demodulation method, an optical communication system, an optical transmitting device, and an optical receiving device capable of inhibiting an increase in the cost and a decrease in the band at the time of multiplexing services can be provided.

DESCRIPTION OF EMBODIMENTS

Hereinafter, embodiments of the present invention will be described with reference to the drawings. The embodiments described below are embodiments of the present invention, and the invention is not limited to the following embodiments. In this specification and the drawings, constituent elements having the same reference signs are assumed to be the same.

Embodiment 1

Figure 3:
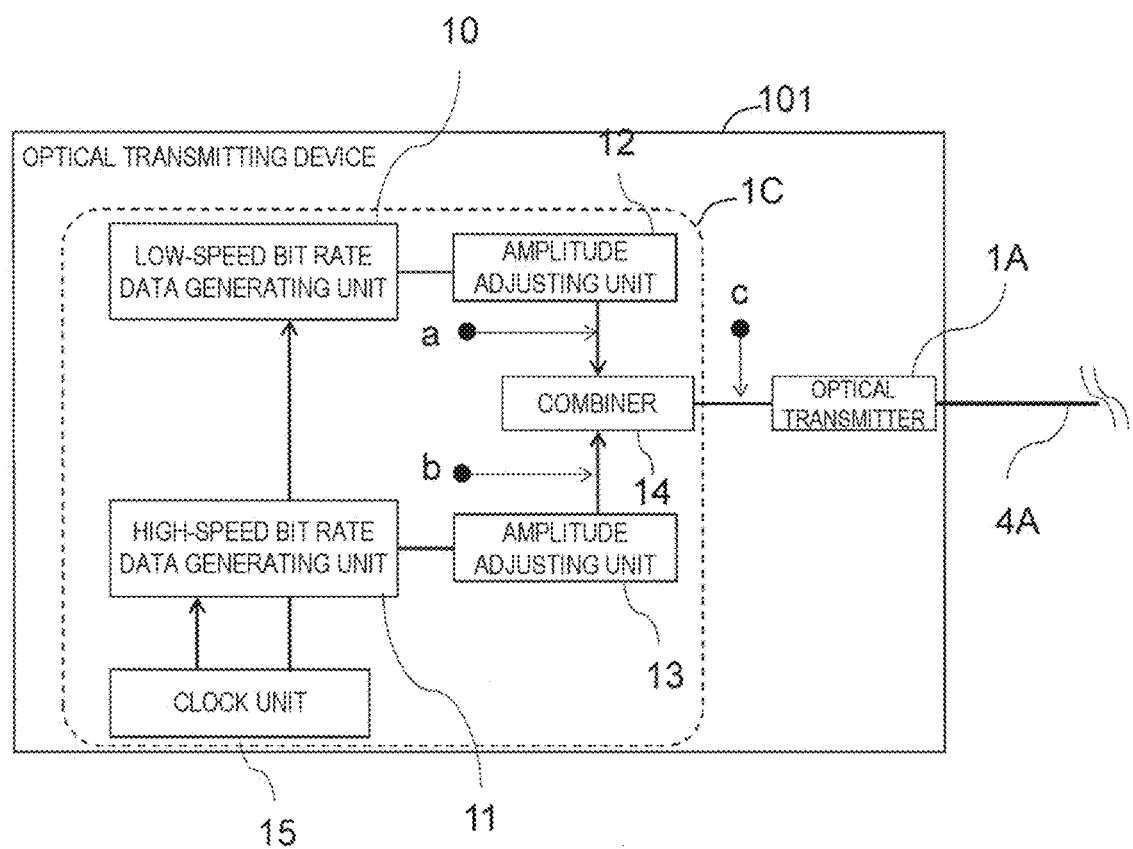
FIG. 3 is a block diagram illustrating an optical transmitting device according to an embodiment of the present invention.

FIG. 3 is a block diagram illustrating an optical transmitting device 101 according to this embodiment. The optical transmitting device 101 includes a modulator 1C that sums a plurality of binary signals having bit rates that are twice or more integer multiples of a bit rate of a low-speed side and having frequencies synchronized with each other with each amplitude further decreasing as the corresponding bit rate becomes higher, and generates a modulation signal representing a combination of bits of the plurality of binary signals as an amplitude value; and an optical transmitter 1A that transmit an optical signal amplitude-modulated using the modulation signal generated by the modulator 1C.

Figure 1:
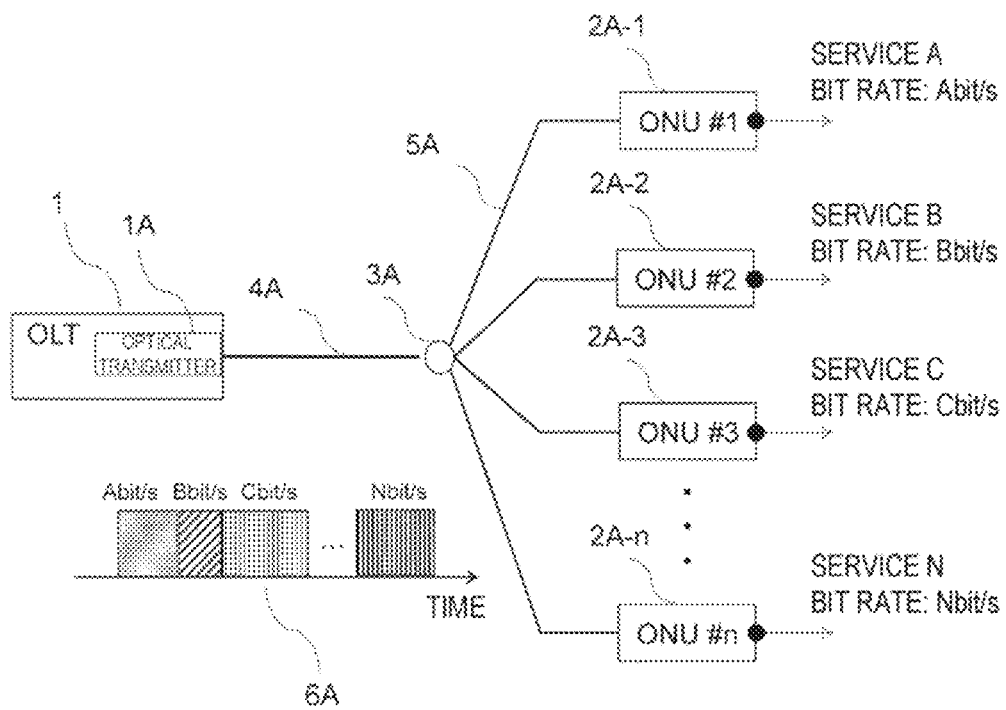
FIG. 1 is a diagram illustrating a PON system corresponding to multiple services according to TDM.
Figure 2:
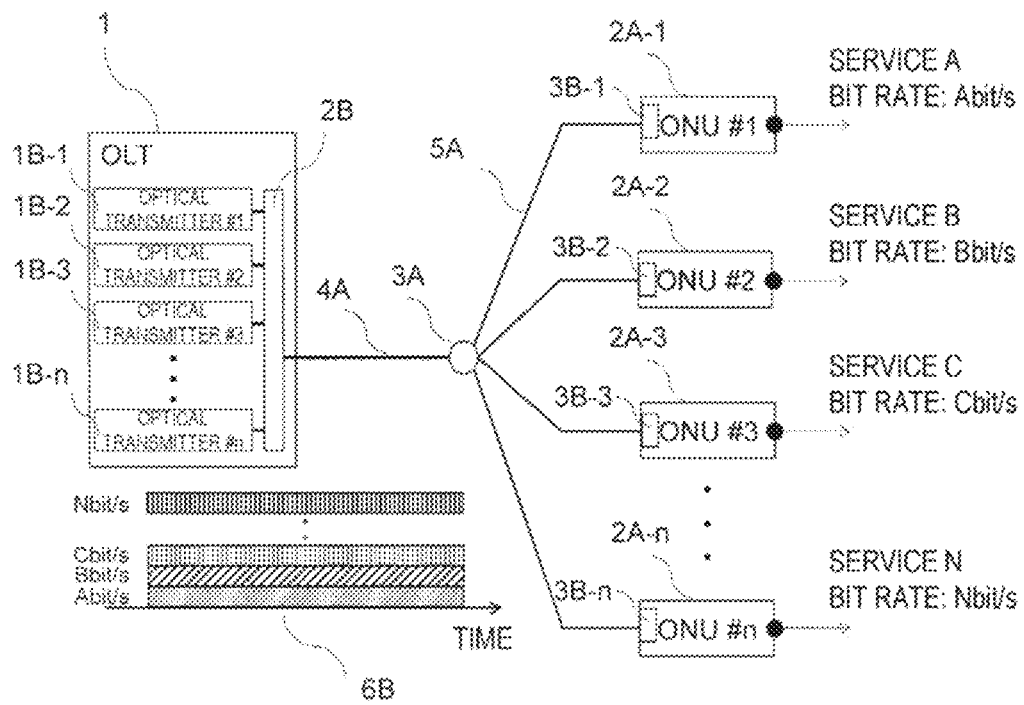
FIG. 2 is a diagram illustrating a PON system corresponding to multiple services according to WDM.

In this embodiment, in order to simplify description of technologies regarding the present invention, two services using a high-speed bit rate and a low-speed bit rate are assumed. Some reference signs in the drawing are the same as those represented in FIG. 1. Reference sign 10 represents a low-speed bit rate data generating unit of A bits/s (service A), reference sign 11 represents a high-speed bit rate data generating unit of B bits/s (service B), reference sign 12 represents an amplitude adjusting unit adjusting an amplitude of a signal output from the low-speed bit rate data generating unit 10, reference sign 13 represents an amplitude adjusting unit adjusting an amplitude of a signal output from the high-speed bit rate data generating unit 11, reference sign 14 represents a multiplexer (for example, a combiner) multiplexing the low-speed bit rate signal and the high-speed bit rate signal, and reference sign 15 represents a clock unit used for taking frequency synchronization between a low-speed bit rate and a high-speed bit rate. The modulator 1C includes the low-speed bit rate data generating unit 10, the high-speed bit rate data generating unit 11, the amplitude adjusting units 12 and 13, the multiplexer 14, and the clock unit 15.

Figure 4:
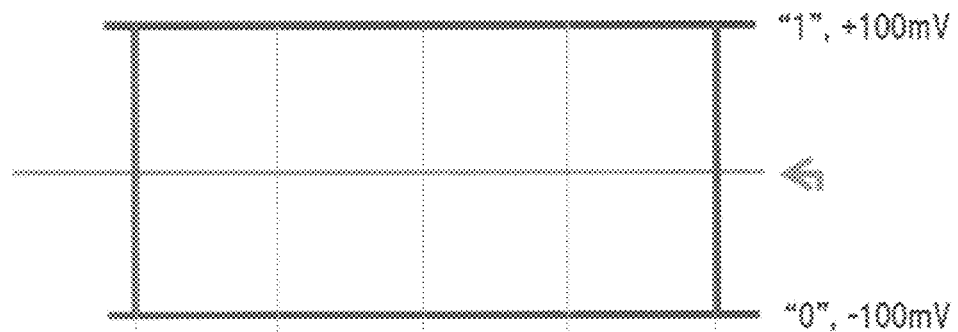
FIG. 4 is a timing chart for generating a multi-level signal in an optical transmitting device according to the embodiment of the present invention.
Figure 4:
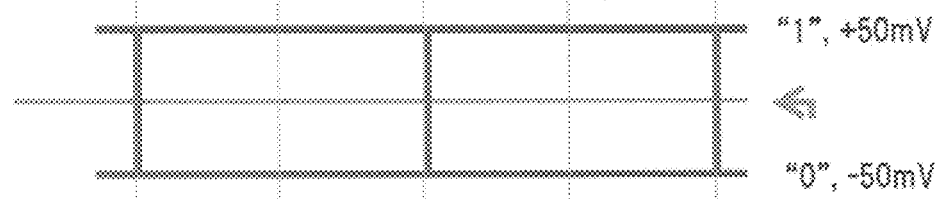
Figure 4:
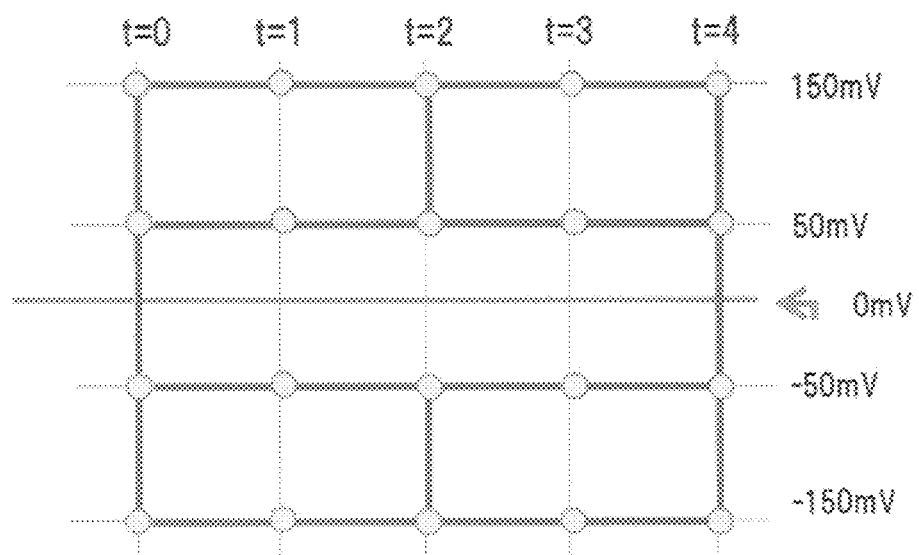

FIG. 4 illustrates a timing chart at positions "a", "b", "c" illustrated in FIG. 3. Here, for example, an amplitude of a signal from the amplitude adjusting unit 13 on the low-speed bit rate side is assumed to be 200 mVpp, and an amplitude of a signal from the amplitude adjusting unit 14 on the high-speed bit rate side is assumed to be 100 mVpp. In this embodiment, A bits/s and B bits/s have a relation of integer multiples, and the high-speed bit rate side B bits/s=2×A bits/s.

Here, as bit combinations of the low-speed bit rate and the high-speed bit rate, there are four patterns including (low-speed bit rate, high-speed bit rate)=(1, 1), (low-speed bit rate, high-speed bit rate)=(1, 0), (low-speed bit rate, high-speed bit rate)=(0, 1), and (low-speed bit rate, high-speed bit rate)=(0, 0). t=0, t=1, t=2, t=3, t=4 illustrated in FIG. 4 illustrate 2X sampling points on the high-speed bit rate side. Hereinafter, amplitudes that may be taken at the sampling points will be described.

(At t=0)

The low-speed bit rate side and the high-speed bit rate side are rise/fall of bits (in other words, a transition from "1" to "0" or a transition from "0" to "1"). For this reason, in a case in which a DC component is removed through a device such as a DC block, the signal has 0 V as its center, and the range of the amplitude that may be taken is as below.

Low-speed bit rate $-100 \text{ mV} \leq V_{low\text{-}speed\ bit\ rate} \leq 100 \text{ mV}$ [Relationship 1]

High-speed bit rate $-50 \text{ mV} \leq V_{high\text{-}speed\ bit\ rate} \leq 50 \text{ mV}$ [Relationship 2]

Therefore, a combined amplitude after multiplexing using the multiplexer 14 is as follows.

$-150 \text{ mV} \leq V\text{mux} \leq 150 \text{ mV}$ [Relationship 3]

(At t=1)

A bit that may be taken by the low-speed bit rate is "1" or "0" and is as below.

Low-speed bit rate $V_{low\text{-}speed\ bit\ rate} = -100 \text{ mV or } 100 \text{ mV}$ [Relationship 4]

A bit that may be taken by the high-speed bit rate is also "1" or "0" and is as below.

High-speed bit rate $V_{high\text{-}speed\ bit\ rate} = -50 \text{ mV or } 50 \text{ mV}$ [Relationship 5]

Therefore, a combined amplitude after multiplexing using the multiplexer 14 according to the combination is as below.

$V$mux=−150 mV in the case of the combination(0, 0), $V$mux=−50 mV in the case of the combination(0, 1), $V$mux=50 mV in the case of the combination(1, 0), and $V$mux=150 mV in the case of the combination(1, 1). [Relationship 6]

(At t=2)

An amplitude that may be taken by the low-speed bit rate is as represented in Relationship 4, the high-speed bit rate side is a rise/fall of the bit and thus, is in the amplitude range represented in Relationship 2, and a combined amplitude after multiplexing using the multiplexer 14 is as below.

$-150 \leq V\text{mux} \leq -50 \text{ mV}$ [Relationship 7]

$50 \leq V\text{mux} \leq 150 \text{ mV}$ [Relationship 8]

(At t=3)

The amplitudes are the same as those as t=1, and thus, a composite output after multiplexing using the multiplexer 14 is as represented in Relationship 6.

(At t=4)

The amplitudes are the same as those as t=0, and thus, a composite output after multiplexing using the multiplexer 14 is as represented in Relationship 3.

Figure 5:
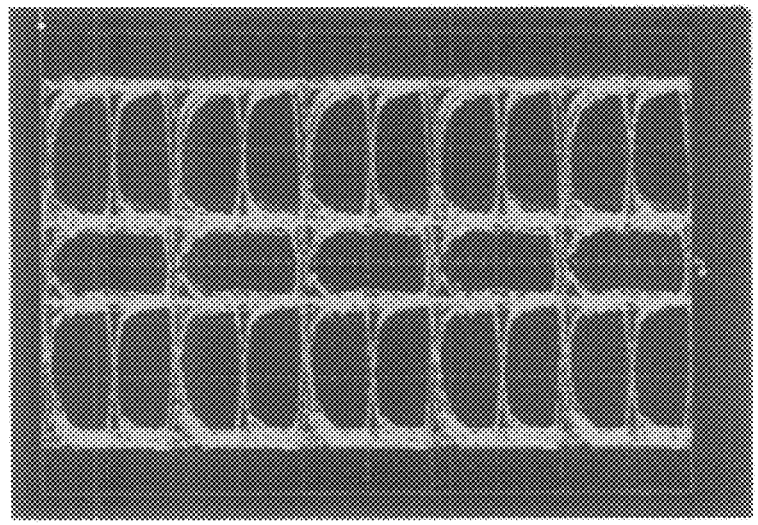
FIG. 5 is an output waveform output by an optical transmitting device according to the embodiment of the present invention.

As described above, when an output waveform after multiplexing using the multiplexer 14 is observed using a sampling oscilloscope, a waveform as illustrated in FIG. 5 is acquired. FIG. 5 illustrates an output waveform after multiplexing using the multiplexer 14 when signals of 2.5 Gbps and 5 Gbps are actually generated by a pulse pattern generator. In this embodiment, although specific values are used which are the signal amplitude of the low-speed bit rate-side being 200 mVpp and the signal amplitude of the high-speed bit rate side being 100 mVpp, the same effect can be acquired when a relation of $V_a > V_b$ is satisfied in a case in which the signal amplitude of the low-speed bit rate is $V_a$, and the signal amplitude of the high-speed bit rate side is $V_b$. In this way, under a condition that bit rates of two signals having different bit rates are integer multiples, the signals can be modulated and output by employing a simple configuration using one transmitter.

Embodiment 2

Figure 6:
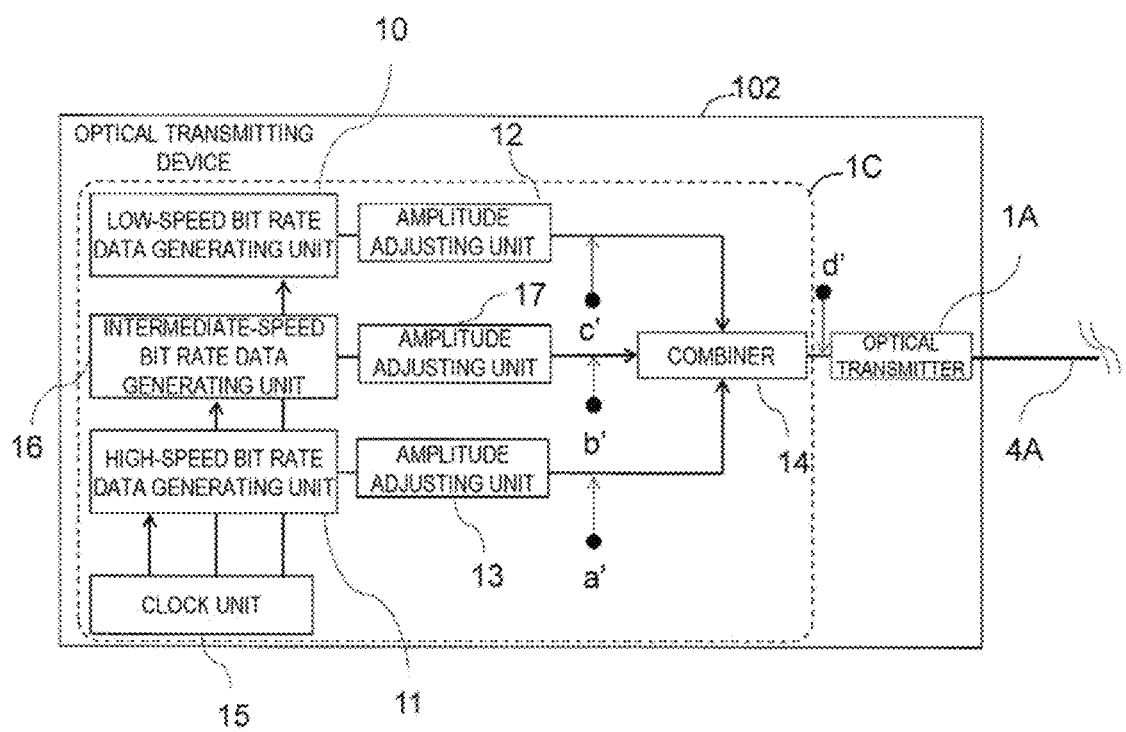
FIG. 6 is a block diagram illustrating an optical transmitting device according to an embodiment of the present invention.

FIG. 6 is a block diagram illustrating an optical transmitting device 102 according to this embodiment. The optical transmitting device 102 has three bit rates including a high-speed bit rate, an intermediate-speed bit rate, and a low-speed bit rate, which is different from the optical transmitting device 101 according to Embodiment 1. In FIG. 6, reference signs are the same as those illustrated in FIG. 3. Reference sign 16 represents an intermediate-speed bit rate data generating unit, and reference sign 17 represents an intermediate-speed bit rate amplitude adjusting unit.

Figure 7:
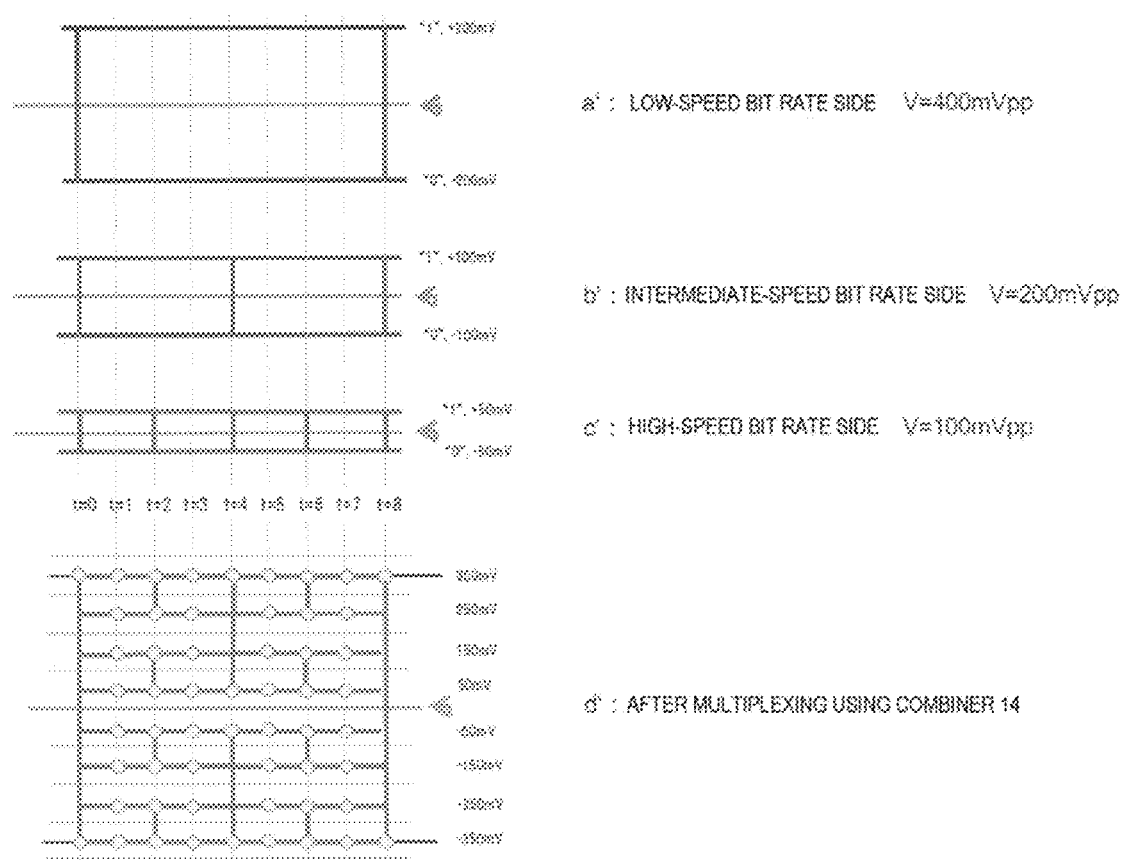
FIG. 7 is a timing chart for generating a multi-level signal in an optical transmitting device according to the embodiment of the present invention.

FIG. 7 illustrates a timing chart at the positions "a'", "b'", "c'", and "d'" illustrated in FIG. 6. Here, for example, an amplitude of a signal from the amplitude adjusting unit 12 on the low-speed bit rate side is assumed to be 400 mVpp, an amplitude of a signal from the amplitude adjusting unit 17 on the intermediate-speed bit rate side is assumed to be 200 mVpp, and an amplitude of a signal from the amplitude adjusting unit 13 on the high-speed bit rate side is assumed to be 100 mVpp, and there is a relation of integer multiples between such bit rates. In this embodiment, the intermediate-speed bit rate is twice as large as the low-speed bit rate, and the high-speed bit rate is four times as large as the low-speed bit rate.

Here, as bit combinations of these three bit rates, there are eight patterns including (low-speed bit rate, intermediate-speed bit rate, high-speed bit rate)=(1, 1, 1), (low-speed bit rate, intermediate-speed bit rate, high-speed bit rate)=(1, 1, 0), (low-speed bit rate, intermediate-speed bit rate, high-speed bit rate)=(1, 0, 1), (low-speed bit rate, intermediate-speed bit rate, high-speed bit rate)=(1, 0, 0), (low-speed bit rate, intermediate-speed bit rate, high-speed bit rate)=(0, 1, 1), (low-speed bit rate, intermediate-speed bit rate, high-speed bit rate)=(0, 1, 0), (low-speed bit rate, intermediate-speed bit rate, high-speed bit rate)=(0, 0, 1), and (low-speed bit rate, intermediate-speed bit rate, high-speed bit rate)=(0, 0, 0). t=0 to t=8 illustrated in FIG. 7 illustrates 2X sampling points on the high-speed bit rate side. Hereinafter, amplitudes that may be taken at the sampling points will be described.

(At t=0)

The low-speed bit rate side, the intermediate-speed bit rate, and the high-speed bit rate side are rise/fall of bits (in other words, a transition from "1" to "0" or a transition from "0" to "1"), and thus, in a case in which a DC component is cut through a device such as a DC block, the signal has 0 V as its center, and the range of the amplitude that may be taken is as below.

Low-speed bit rate $-200$ mV $\leq V_{low\text{-}speed\ bit\ rate} \leq 200$ mV [Relationship 9]

Intermediate-speed bit rate $-100$ mV $\leq V_{intermediate\text{-}speed\ bit\ rate} \leq 100$ mV [Relationship 10]

High-speed bit rate $-50$ mV $\leq V_{high\text{-}speed\ bit\ rate} \leq 50$ mV [Relationship 11]

Therefore, combined amplitudes after multiplexing using the multiplexer 14 are as follows.

$-350$ mV $\leq V$mux $\leq 350$ mV [Relationship 12]

(At t=1)

Bits that may be taken by the low-speed bit rate, the intermediate-speed bit rate, and the high-speed bit rate are "1" or "0" and are as below.

High-speed bit rate $V_{low\text{-}speed\ bit\ rate} = -200$ mV or $200$ mV [Relationship 13]

Intermediate-speed bit rate $V_{intermediate\text{-}speed\ bit\ rate} = -100$ mV or $100$ mV [Relationship 14]

High-speed bit rate $V_{high\text{-}speed\ bit\ rate} = -50$ mV or $50$ mV [Relationship 15]

Therefore, combined amplitudes after multiplexing using the multiplexer 14 according to the combinations are as below.

$V$mux$=-350$ mV in the case of the combination(0, 0, 0), $V$mux$=-250$ mV in the case of the combination(0, 0, 1), $V$mux$=-150$ mV in the case of the combination(0, 1, 0), $V$mux$=-50$ mV in the case of the combination(0, 1, 1), $V$mux$=50$ mV in the case of the combination(1, 0, 0), $V$mux$=150$ mV in the case of the combination (1, 0, 1), $V$mux$=250$ mV in the case of the combination(1, 1, 0), and $V$mux$=350$ mV in the case of the combination(1, 1, 1). [Relationship 16]

(At t=2)

An amplitude that may be taken by the low-speed bit rate is as represented in Relationship 13, an amplitude that may be taken by the intermediate-speed bit rate is as represented in Relationship 14, and an amplitude that may be taken by the high-speed bit rate is as represented in Relationship 11. Therefore, combined amplitudes after multiplexing using the multiplexer 14 are as below.

$250 \leq V$mux$\leq 350$ mV [Relationship 17]

$50 \leq V$mux$\leq 150$ mV [Relationship 18]

$-150 \leq V$mux$\leq -50$ mV [Relationship 19]

$-350 \leq V$mux$\leq -250$ mV [Relationship 20]

(At t=3)

Because the amplitudes are the same as those at t=1, the composite output after multiplexing using the multiplexer 14 is as represented in Relationship 16.

(At t=4)

Because the amplitude that may be taken by the low-speed bit rate is as represented in Relationship 13, and the amplitude ranges that may be taken by the intermediate-speed bit rate and the high-speed bit rate are as represented in Relationships 10 and 11, a composite output after multiplexing using the multiplexer 14 is as below.

$-350 \leq V\text{mux} \leq -50$ mV  [Relationship 21]

$50 \leq V\text{mux} \leq 350$ mV  [Relationship 22]

(At t=5)

Because the amplitudes are the same as those at t=1, a composite output after multiplexing using the multiplexer 14 is as represented in Relationship 16.

(At t=6)

Because the amplitudes are the same as those at t=2, a composite output after multiplexing using the multiplexer 14 is as represented in Relationships 17 to 20.

(At t=7)

Because the amplitudes are the same as those at t=1, a composite output after multiplexing using the multiplexer 14 is as represented in Relationship 16.

(At t=8)

Because the amplitudes are the same as those at t=0, a composite output after multiplexing using the multiplexer 14 is as represented in Relationship 12.

As described above, when an output after multiplexing using the multiplexer 14 is observed using a sampling oscilloscope, a waveform as denoted by "d'" in FIG. 7 is acquired. In this embodiment, the signal amplitude of the low-speed bit rate side is 400 mVpp, the signal amplitude of the intermediate-speed bit rate side is 200 mVpp, and the signal amplitude of the high-speed bit rate side is 100 mVpp. But in a case in which the signal amplitude of the low-speed bit rate is Va, the signal amplitude of the intermediate-speed bit rate is Vb, and the signal amplitude of the high-speed bit rate is Vc, the same effects can be acquired when a relation of "$V_a > V_b > V_c$" is satisfied. In this way, under a condition that bit rates of three signals having different bit rates are integer multiples, the signals can be modulated and output by employing a simple configuration using one transmitter.

Embodiment 3

Figure 8:
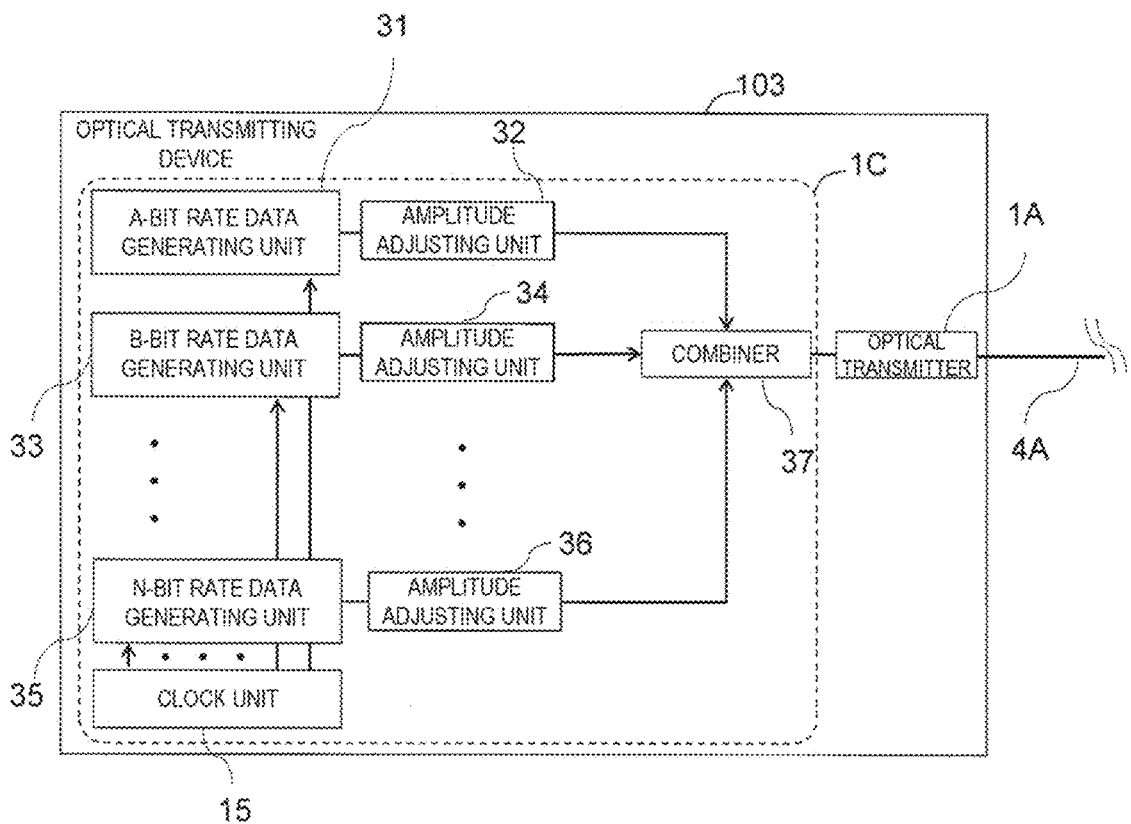
FIG. 8 is a block diagram illustrating an optical transmitting device according to an embodiment of the present invention.

FIG. 8 is a block diagram illustrating an optical transmitting device 103 according to this embodiment. The optical transmitting device 103 generalizes handling bit rates as N, which is different from the optical transmitting device 101 according to Embodiment 1 and the optical transmitting device 102 according to Embodiment 2.

Reference sign 31 represents an A bit rate data generating unit, reference sign 32 represents an A bit rate amplitude adjusting unit, reference sign 33 represents a B bit rate data generating unit, reference sign 34 represents a B bit rate amplitude adjusting unit, reference sign 35 represents an N bit rate data generating unit, reference sign 36 represents an N bit rate amplitude adjusting unit, and reference sign 37 represents a multiplexer of N:1. A modulator 1C includes the bit rate data generating units 31, 33, and 35, the amplitude adjusting units 32, 34, and 36, a multiplexer 37, and a clock unit 15.

N bit rates have a relation of integer multiples, and, when a lowest bit rate is A bits/s, B=a×A, C=b×B, D=c×C, (here, a, b, . . . are integers larger than one), in a case in which relations of Va>Vb> . . . >Vn (here, an amplitude value of the A bit rate Va, . . . , and an amplitude value of the N bit rate Vn) among amplitudes is satisfied, different bit rates illustrated in Embodiment 1 and Embodiment 2 can be modulated and output by employing a simple configuration using one transmitter.

Embodiment 4

Figure 9:
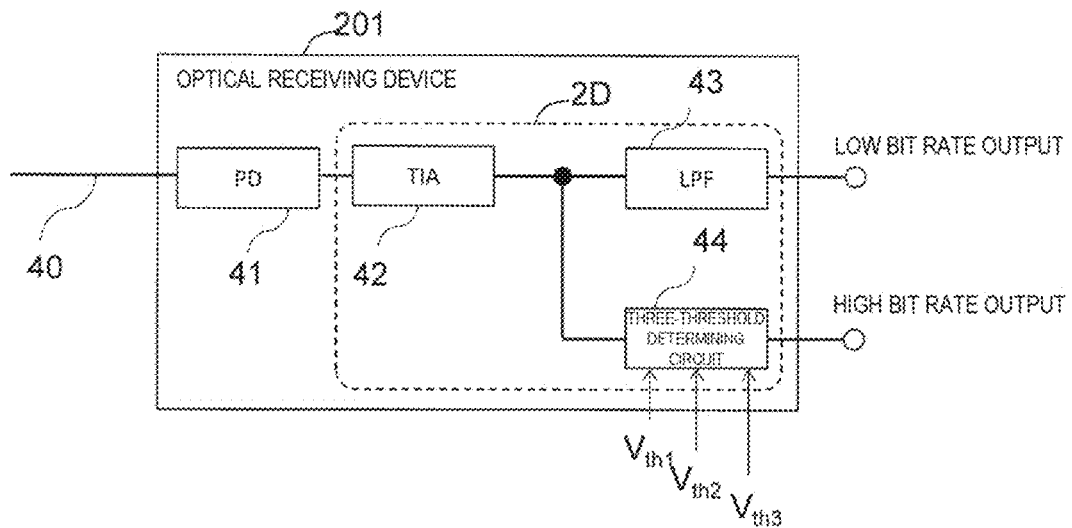
FIG. 9 is a block diagram illustrating an optical receiving device according to an embodiment of the present invention.

FIG. 9 is a block diagram illustrating an optical receiving device 201 according to this embodiment. The optical receiving device 201 includes an optical receiver 41 that performs photoelectric conversion of an optical signal amplitude-modulated using a modulation signal representing a combination of bits of a plurality of binary signals as an amplitude value by summing a plurality of binary signals having bit rates that are twice or more integer multiples of a bit rate of a low-speed side and having frequencies synchronized with each other with each amplitude further decreasing as the corresponding bit rate becomes higher, and generates a reception signal corresponding to a modulation signal, and a frequency splitter 2D that determines the combination of the bits of the plurality of binary signals by identifying all the amplitude values included in the reception signal using thresholds smaller than the number of the combinations of the bits of the plurality of binary signals by one and identifies the bits of the plurality of binary signals summed.

In this embodiment, an optical receiving device that demodulates a signal modulated by the optical transmitting device 101 according to Embodiment 1 will be described. In this embodiment, for simple description of a demodulation technology, two bit rates (two services) including a high-speed bit rate and a low-speed bit rate will be assumed. Reference sign 40 represents an optical fiber, reference sign 41 represents a PD that converts input light into a current, reference sign 42 represents a trans-impedance amplifier (TIA) that converts a current into a voltage, reference sign 43 represents a low pass filter (LPF) having a bandwidth of a low-speed bit rate, and reference sign 44 represents thresholds of a three-threshold determining circuits (there is a relation of $V_{th1} < V_{th2} < V_{th3}$ in the drawing). A frequency splitter 2D includes the TIA 42, the LPF 43, and the three-threshold determining circuit 44.

Modulated light input to the PD 41 is converted into a current and is converted into voltage through the TIA 42. A signal after output from the TIA is divided into two paths and a first path of them is caused to pass through the LPF 43 having a bandwidth of the low-speed bit rate side to cut a high frequency component, resulting a low-speed bit rate signal extracted.

Figure 10:
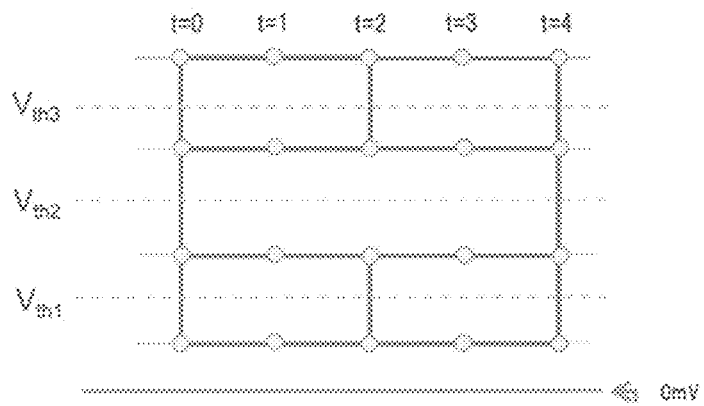
FIG. 10 is a diagram illustrating a method of determining a binary signal from a multi-level signal in an optical receiving device according to the embodiment of the present invention.

FIG. 10 is a diagram illustrating a method in which the three-threshold determining circuit 44 extracts a signal of a high-speed bit rate side. The three-threshold determining circuit 44 has three thresholds ($V_{th1}$, $V_{th2}$, and $V_{th3}$) and extracts a signal on the high-speed bit rate side using the following determination logic. The three-threshold determining circuit 44 having three thresholds can be realized, for example, by combining comparators such as comparators.

When $V_{th3} < V_{input\ voltage}$, the signal on the high-speed bit rate side is "1".  [Relationship 23]

When $V_{th2} < V_{input\ voltage} < V_{th3}$, the signal on the high-speed bit rate side "0".  [Relationship 24]

When $V_{th1} < V_{input\ voltage} < V_{th2}$, the signal on the high-speed bit rate side "1".  [Relationship 25]

When $V_{th1} > V_{input\ voltage}$, the signal on the high-speed bit rate side "0".  [Relationship 26]

Here, the thresholds are set as follows. In a case in which an output voltage of the TIA when a signal having "1" on the low-speed bit rate side and "0" on the high-speed bit rate side is received is $V_a$, an output voltage of the TIA when a signal having "0" on the low-speed bit rate side and "1" on the high-speed bit rate side is received is $V_b$, and $V_a > V_b$, the thresholds follow the following relationships.

$V_{th1} = V_b/2$  [Relationship 27]

$V_{th2}=(V_a+V_b)/2$ [Relationship 28]

$V_{th3}=V_a+V_b/2$ [Relationship 29]

In a case in which a signal having two different bit rates is modulated under condition that the bit rates are integer multiples, a signal on the low-speed bit rate side and a signal on the high-speed bit rate can be extracted in a divisional manner by employing a simple configuration similar to that of the transmission side. Although a configuration in which the output of the TIA 42 branches into two paths is illustrated in FIG. 9, if only an amplifier having high linearity is installed after the output of the TIA 42, and the thresholds $V_{th1}$ to $V_{th3}$ of the threshold determining circuit is configured to be multiplied by a gain of the amplifier, similar effects can be acquired also by causing the output to branch and using resultant outputs.

Embodiment 5

Figure 11:
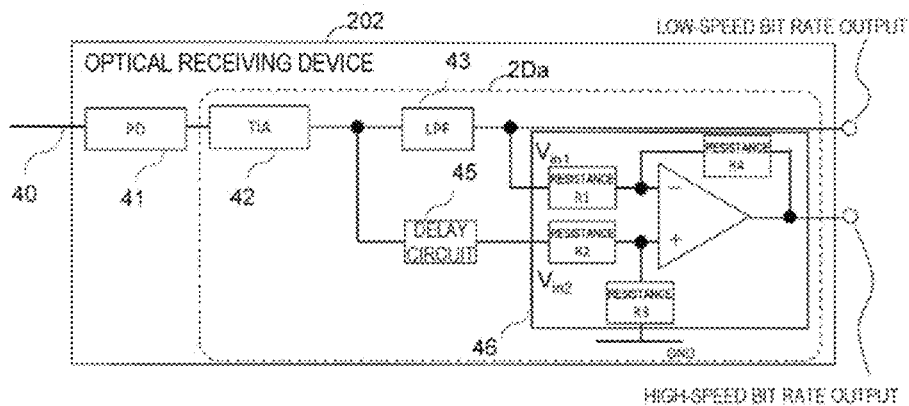
FIG. 11 is a block diagram illustrating another optical receiving device according to another embodiment of the present invention.

FIG. 11 is a block diagram illustrating an optical receiving device 202 according to this embodiment. The optical receiving device 202 includes an optical receiver 41 that performs photoelectric conversion of an optical signal amplitude-modulated using a modulation signal representing a combination of bits of a plurality of binary signals as an amplitude value by summing a plurality of binary signals having bit rates that are twice or more integer multiples of a bit rate of a low-speed side and having frequencies synchronized with each other with each amplitude further decreasing as the corresponding bit rate becomes higher, and generates a reception signal corresponding to a modulation signal; and a frequency splitter 2Da that generates a low-speed side signal by transmitting a low-speed side of the reception signal through a low pass filter, and separates the plurality of binary signals from the reception signal by subtracting the low-speed side signal from the reception signal.

In this embodiment, an optical receiving device of a different system that demodulates a signal modulated by the optical transmitting device 101 according to Embodiment 1 will be described. The optical receiving device 202 extracts a signal of the high-speed bit rate side using an analog circuit, which is different from the optical receiving device 201 according to Embodiment 4. In this embodiment, similarly to the fourth embodiment, two bit rates (two services) including a high-speed bit rate and a low-speed bit rate will be assumed. Some reference signs in the drawing are the same as those illustrated in FIG. 9. Reference sign 45 represents a delay circuit having a time constant that is in the same level as that of the LPF 43, and reference sign 46 represents a subtraction circuit. A frequency splitter 2Da includes a TIA 42, an LPF 43, a delay circuit 45, and an operation circuit 46.

By causing a signal to pass through the LPF 43 having a bandwidth of the low-speed bit rate side, a high frequency component is cut, and a low-speed bit rate signal is extracted, which is similar to Embodiment 4. The frequency splitter 2Da extracts a high-speed bit rate signal by subtracting a voltage of a signal of the low-speed bit rate of the output of the LPF 43 from an output (a voltage of a composite signal of the low-speed bit rate and the high-speed bit rate) of the TIA 42.

The subtraction circuit 46, for example, is an operational amplifier, and it is known that the output voltage $V=(V_{in2}-V_{in1})$ when resistance R1=R2=R3=R4 in the drawing. In addition, the delay circuit 45 is installed for matching timings of the composite signal and the low-speed bit rate signal with each other and may be omitted when the timings of the composite signal and the low-speed bit rate match each other using a signal line or the like. In a case in which a signal having two bit rates is modulated under a condition that the bit rates are integer multiples, signals of the low-speed bit rate side and the high-speed bit rate side can be extracted in a divisional manner by employing a simple configuration that is similar to that of the transmission side.

Embodiment 6

Figure 12:
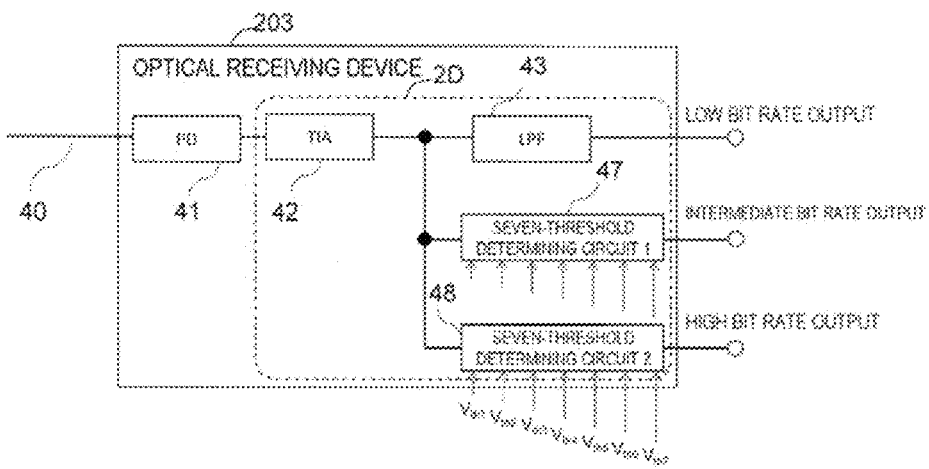
FIG. 12 is a block diagram illustrating an optical receiving device according to an embodiment of the present invention.

FIG. 12 is a block diagram illustrating an optical receiving device 203 according to this embodiment. The optical receiving device 203 has three bit rates including a high-speed bit rate, an intermediate-speed bit rate, and a low-speed bit rate, which is different from the optical receiving device 201 according to Embodiment 4. The optical receiving device 203 demodulates an optical signal modulated by the optical transmitting device 102 according to Embodiment 2. Reference signs illustrated in the drawing are the same as those illustrated in FIG. 9. Reference sign 47 represents a seven-threshold determining circuit for identifying an intermediate-speed bit rate, and reference sign 48 represents a seven-threshold determining circuit for identifying a high-speed bit rate (there is a relation of thresholds of $V_{th1}<V_{th2}<V_{th3}<V_{th4}<V_{th5}<V_{th6}<V_{th7}$ in both the circuits). The frequency splitter 2D includes the TIA 42, the LPF 43, and the seven-threshold determining circuits 47 and 48.

Modulated light input to the PD 41 is converted into a current and is converted into voltage through the TIA 42. The signal after the output of the TIA 42 is divided into three paths, and a low-speed bit rate signal is extracted by cutting a high frequency component by configuring a first path to pass through the LPF 43 having a bandwidth of the low-speed bit rate side.

The intermediate-speed bit rate and the high-speed bit rate are extracted by the threshold determining circuits 47 and 48 having seven thresholds using the following determination logic.

First, the threshold determining circuit 47 determines the high-speed bit rate as follows.

When $V_{th7}<V_{input\ voltage}$, the signal on the high-speed bit rate side is "1". [Relationship 30]

When $V_{th6}<V_{input\ voltage}<V_{th7}$, the signal on the high-speed bit rate side is "0". [Relationship 31]

When $V_{th5}<V_{input\ voltage}<V_{th6}$, the signal on the high-speed bit rate side is "1". [Relationship 32]

When $V_{th4}<V_{input\ voltage}<V_{th5}$, the signal on the high-speed bit rate side is "0". [Relationship 33]

When $V_{th3}<V_{input\ voltage}<V_{th4}$, the signal on the high-speed bit rate side is "1". [Relationship 34]

When $V_{th2}<V_{input\ voltage}<V_{th3}$, the signal on the high-speed bit rate side is "0". [Relationship 35]

When $V_{th1}<V_{input\ voltage}<V_{th2}$, the signal on the high-speed bit rate side is "1". [Relationship 36]

When $V_{th1}>V_{input\ voltage}$, the signal on the high-speed bit rate side is "0". [Relationship 37]

Next, the threshold value determining circuit 48 determines the intermediate-speed bit rate as follows.

When $V_{th7}<V_{input\ voltage}$, the signal on the high-speed bit rate side is "1". [Relationship 38]

When $V_{th6} < V_{input\ voltage} < V_{th7}$, the signal on the high-speed bit rate side is "1". [Relationship 39]

When $V_{th5} < V_{input\ voltage} < V_{th6}$, the signal on the high-speed bit rate side is "0". [Relationship 40]

When $V_{th4} < V_{input\ voltage} < V_{th5}$, the signal on the high-speed bit rate side is "0". [Relationship 41]

When $V_{th3} < V_{input\ voltage} < V_{th4}$, the signal on the high-speed bit rate side is "1". [Relationship 42]

When $V_{th2} < V_{input\ voltage} < V_{th3}$, the signal on the high-speed bit rate side is "1". [Relationship 43]

When $V_{th1} < V_{input\ voltage} < V_{th2}$, the signal on the high-speed bit rate side is "0". [Relationship 44]

When $V_{th1} > V_{input\ voltage}$, the signal on the high-speed bit rate side is "0". [Relationship 45]

In addition, the optical signal is modulated by the optical transmitting device 102 such that a sum of voltages in a combination of bits is not superimposed on the output of the TIA 42. For example, when the voltage on the low-speed bit rate side $V_a$, the voltage of the intermediate-speed bit rate is $V_b$, and the voltage of the high-speed bit rate is $V_c$, voltage values of the bit rates are set such that $V_a = 4V_c$ and $V_b = 2V_c$.

Here, the thresholds are set as follows.

$V_{th1} = V_c/2$ [Relationship 46]

$V_{th2} = (V_b + V_c)/2$ [Relationship 47]

$V_{th3} = V_b + V_c/2$ [Relationship 48]

$V_{th4} = (V_a + V_b + V_c)/2$ [Relationship 49]

$V_{th5} = V_a + V_c/2$ [Relationship 50]

$V_{th6} = V_a + V_b/2 + V_c/2$ [Relationship 51]

$V_{th7} = V_a + V_b + V_c/2$ [Relationship 52]

In a case in which a signal having three different bit rates is modulated under condition that the bit rates are integer multiples, a signal on the low-speed bit rate side and a signal on the high-speed bit rate can be extracted in a divisional manner by employing a simple configuration similar to that of the transmission side. Although a configuration in which the output of the TIA 42 branches into three paths is illustrated in FIG. 12, if only an amplifier having high linearity is installed after the output of the TIA 42, and the thresholds $V_{th1}$ to $V_{th7}$ of the threshold determining circuit is configured to be multiplied by a gain of the amplifier in Relationships 27 to 29, similar effects can be acquired also by causing the output to branch and using resultant outputs.

Embodiment 7

Figure 13:
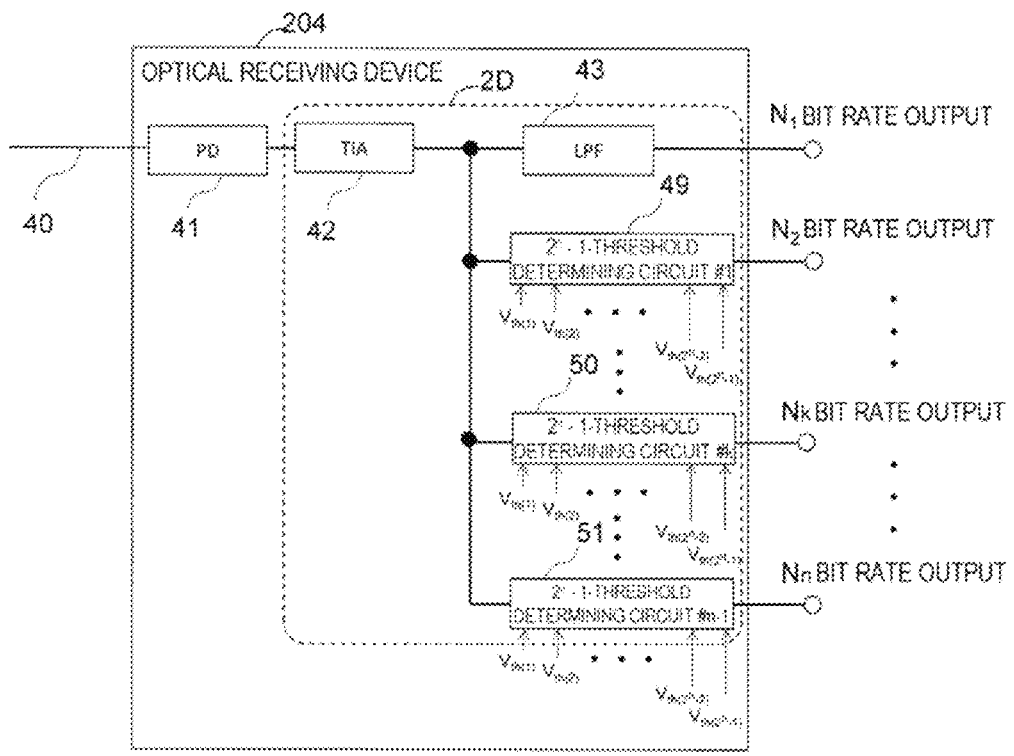
FIG. 13 is a block diagram illustrating an optical receiving device according to an embodiment of the present invention.

FIG. 13 is a block diagram illustrating an optical receiving device 204 according to this embodiment. The optical receiving device 204 generalizes the number of handled bit rates as n, which is different from the optical receiving devices 201 and 203 according to Embodiments 4 and 6.

In the drawing, reference signs are the same as those illustrated in FIG. 12. A first bit rate ($N_1$), a second bit rate ($N_2$), . . . , a k-th bit rate ($N_k$), . . . , and an n-th bit rate ($N_n$) have a relation of integer multiples, and the speeds are assumed to be $N_1 < N_2 < \ldots < N_k < \ldots < N_n$. At this time, reference sign 49 represents a threshold determining circuit used for identifying a signal of the second bit rate ($N_2$), reference sign 50 represents a threshold determining circuit used for identifying a signal of the k-th bit rate ($N_k$), and reference sign 51 represents a threshold determining circuit used for identifying a signal of the n-th bit rate ($N_n$). The frequency splitter 2D includes the TIA 42, the LPF 43, and ($2^n - 1$)-threshold determining circuits (49 to 51).

Modulated light input to the PD 41 is converted into a current and is converted into a voltage through the TIA 42. The signal after the output of the TIA 42 is divided into n paths, and a low-speed bit rate signal can be extracted by cutting a high frequency component by configuring a first path to pass through the LPF 43 having a bandwidth of the low-speed bit rate side.

Signals of the k-th bit rate ($N_k$) are extracted by the threshold determining circuits 49 to 51 having ($2^n - 1$) thresholds.

First, a combination of a first ($N_1$) bit to an n-th bit ($N_n$) is present as $2^n$ represented in each row of a matrix on the right side of the following relationship.

[Math. 53]

$$(N_1, N_2, \ldots, N_k, \ldots, N_{n-1}, N_n) = \begin{pmatrix} 0, 0, \ldots, X_{1k}, \ldots, 0, 0 \\ 0, 0, \ldots, X_{2k}, \ldots, 0, 1 \\ 0, 0, \ldots, X_{3k}, \ldots, 1, 0 \\ 0, 0, \ldots, X_{4k}, \ldots, 1, 1 \\ \vdots \\ 1, 1, \ldots, X_{(2^n-1)k}, \ldots, 1, 0 \\ 1, 1, \ldots, X_{2^n k}, \ldots, 1, 1 \end{pmatrix}$$ (Relationship 53)

Here, k=1, . . . , n, $X_{1k} = 0$, and $X_{2^n k} = 1$.

Assuming that a determination logic causes the output of the threshold determining circuit to be "1" when a signal of the k-th bit rate (Nk) is "1" and causes the output to be "0" when the signal is "0", a determination logic and thresholds of the threshold determining circuit extracting the k-th signal from each combination of bits represented in an m-th row (here, m=2, 3, . . . , $2^n - 1$) in a matrix on the right side represented in Relationship 53 are set such that the following relationships are satisfied.

When $V_{th(m-1)} < V_{input\ voltage} < V_{th(m)}$, the signal is "1" (when $X_{mk} = 1$). [Relationship 54]

When $V_{th(m-1)} < V_{input\ voltage} < V_{th(m)} < V_{th(m)}$, the signal is "0" (when $X_{mk} = 0$). [Relationship 55]

In addition, when m=1 and $V_{input\ voltage} < V_{th(m)}$ for all k, the signal is "0". When m=2n and $V_{th(m-1)} < V_{input\ voltage}$, the signal is "1" for all k.

In a case in which a signal having n different bit rates is modulated under a condition that the bit rates are integer multiples, a signal can be extracted for each of n bit rates by employing a simple configuration that is similar to that of the transmission side. Although a configuration in which the output of the TIA 42 branches into n paths is illustrated in FIG. 13, if only an amplifier having high linearity is installed after the output of the TIA 42, and the thresholds of the threshold determining circuit is configured to be multiplied by a gain of the amplifier, similar effects can be acquired also by causing the output to branch and using resultant outputs.

Embodiment 8

Figure 14:
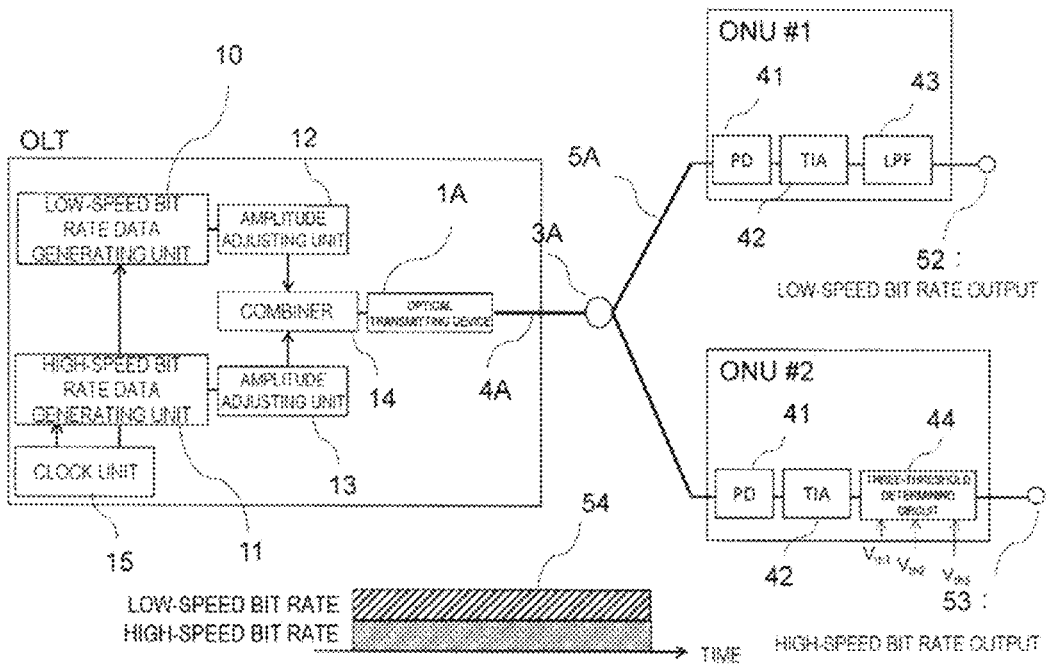
FIG. 14 is a block diagram illustrating an optical communication system according to the embodiment of the present invention.

FIG. 14 is a block diagram illustrating an optical communication system 301 of this embodiment. The optical communication system 301 includes a transmission circuit that sums a plurality of binary signals having bit rates that are twice or more integer multiples of a bit rate of a low-speed side and having frequencies synchronized with each other with each amplitude further decreasing as the corresponding bit rate becomes higher, generates a modulation signal representing a combination of bits of the plurality of binary signals as an amplitude value, and transmits an optical signal amplitude-modulated using the modulation signal, and a reception circuit that performs photoelectric conversion of the optical signal transmitted in the transmitting step, generates a reception signal corresponding to the modulation signal, determines the combination of the bits of the plurality of binary signals by identifying all the amplitude values included in the reception signal using thresholds smaller than the number of the combinations of the bits of the plurality of binary signals by one, and identifies the bits of the plurality of binary signals summed.

The optical communication system 301 is a PON system that outputs two bit rates of different heights for each ONU using the modulation system according to the Embodiment 1 and the demodulation system according to the Embodiment 4. In the drawing, reference signs are the same as those represented until now. Reference sign 52 represents a low-speed bit rate output port, reference sign 53 represents a high-speed bit rate output port, and reference sign 54 represents a timing chart in a downlink direction. The OLT is the same as the optical transmitting device 101 according to Embodiment 1.

ONU #1 is configured to cut a high frequency component using the LPF 43 and output signals of only a low bit rate from the port 52, and ONU #2 is configured to output signals of only bit rates higher than the three-value threshold determining circuit 44 from the port 53. Detailed principles of the modulation system and the demodulation system are similar to those described until now. In this way, by using only a functional unit that extracts a desired bit rate on the demodulation side in a case in which a bit rate different for each ONU is output under a condition that bit rates are integral multiples, multiple services of the band occupying type can be economically realized by employing a simple configuration using one transmitter.

In addition, in a case in which one ONU outputs both a high-speed bit rate and a low-speed bit rate, the configuration of the optical receiving device 201 according to Embodiment 4 may be employed. In addition, the configuration of the optical receiving device 202 according to Embodiment 5 may be employed.

Although a configuration of high/low two bit rates is illustrated in FIG. 14 for simplifying description, a configuration of the optical transmitting device 102 according to Embodiment 2 and the optical receiving device 203 according to Embodiment 6 may be employed in the case of three bit rates, and a configuration of the optical transmitting device 103 according to Embodiment 3 and the optical receiving device 204 according to Embodiment 7 may be employed in the case of N bit rates for the implementation.

Other Embodiments

In the embodiment described above, for the convenience of description, although a configuration of one transmitter, in other words, a configuration for one wavelength has been illustrated, a band can be further extended by employing a configuration in which transmitters having a plurality of wavelengths are disposed on the OLT side, the wavelengths are multiplexed using a WDM filter, and each wavelength is split using the WDM filter on the ONU side.

Effects of the Invention

According to the disclosure, for an optical communication system accommodating a plurality of services having different bit rates, a modulation/demodulation system economically realizing multiple services of the band occupying type by employing a simple configuration using one transmitter under a condition that the bit rates are integer multiples and an optical communication system using the modulation/demodulation system described above can be provided.

REFERENCE SIGNS LIST 1A optical transmitter
1C Modulator
2D and 2Da Frequency splitter
4A Main subscriber optical fiber line
10 Low-speed bit rate data generating unit
11 High-speed bit rate data generating unit
12 and 13: Amplitude adjusting unit
14 Multiplexer (combiner)
15 Clock unit
16 Intermediate-speed bit rate data generating unit
17 Amplitude adjustment unit
31, 33, and 35 Data generating unit
32, 34, and 36 Amplitude adjusting unit
37 Multiplexer (combiner)
40 Optical fiber
41 Optical receiver (PD)
42 Trans-Impedance Amplifier (TIA)
43 Low Pass Filter (LPF)
44 Three-threshold determining circuit
45 Delay circuit
46 Operation circuit
47 and 48: Seven-threshold determining circuit
49 to 51 $2^n-1$-threshold determining circuit
52 Low-speed bit rate output port
53 High-Speed bit rate output port

The invention claimed is:
1. An optical modulation/demodulation method comprising:
a transmitting step of
summing a plurality of binary signals having bit rates that are twice or more integer multiples of a bit rate of a low-speed side and having frequencies synchronized with each other with each amplitude further decreasing as the corresponding bit rate becomes higher,
generating a modulation signal representing a combination of bits of the plurality of binary signals as an amplitude value, and
transmitting an optical signal amplitude-modulated using the modulation signal; and
a receiving step of
performing photoelectric conversion of the optical signal transmitted in the transmitting step,
generating a reception signal corresponding to the modulation signal,
determining the combination of the bits of the plurality of binary signals by identifying all the amplitude values included in the reception signal using thresholds smaller than the number of the combinations of the bits of the plurality of binary signals by one, and
identifying the bits of the plurality of binary signals summed.

2. The optical modulation/demodulation method of claim 1 further comprises dividing the reception signal into two signal paths; and generating a low-speed side signal by passing the reception signal on one of the two signal paths through a low pass filter.

3. The optical modulation/demodulation method of claim 2 further comprises separating remainder of the binary signals from the reception signal by subtracting the low-speed side signal from the reception signal on the other of the two signal paths before the step of determining the combination of bits of the plurality of binary signals.

4. An optical communication system comprising:
a transmission circuit configured to
sum a plurality of binary signals having bit rates that are twice or more integer multiples of a bit rate of a low-speed side and having frequencies synchronized with each other with each amplitude further decreasing as the corresponding bit rate becomes higher,
generate a modulation signal representing a combination of bits of the plurality of binary signals as an amplitude value, and
transmit an optical signal amplitude-modulated using the modulation signal; and
a reception circuit configured to
perform photoelectric conversion of the optical signal transmitted in the transmitting step,
generate a reception signal corresponding to the modulation signal,
determine the combination of the bits of the plurality of binary signals by identifying all the amplitude values included in the reception signal using thresholds smaller than the number of the combinations of the bits of the plurality of binary signals by one, and
identify the bits of the plurality of binary signals summed.

5. The optical communication system of claim 4 wherein the reception circuit is configured to divide the reception signal into two signal paths; and generate a low-speed side signal by passing the reception signal on one of the two signal paths through a low pass filter.

6. The optical communication system of claim 5 wherein the reception circuit is configured subtract the low-speed side signal from the reception signal on the other of the two signal paths before determining the combination of bits of the plurality of binary signals.

7. An optical receiving device comprising:
an optical receiver configured to
perform photoelectric conversion of an optical signal amplitude-modulated using a modulation signal representing a combination of bits of a plurality of binary signals as an amplitude value by summing a plurality of binary signals having bit rates that are twice or more integer multiples of a bit rate of a low-speed side and having frequencies synchronized with each other with each amplitude further decreasing as the corresponding bit rate becomes higher, and
generate a reception signal corresponding to a modulation signal; and
a frequency splitter configured to
determine the combination of the bits of the plurality of binary signals by identifying all the amplitude values included in the reception signal using thresholds smaller than the number of the combinations of the bits of the plurality of binary signals by one and
identify the bits of the plurality of binary signals summed.

* * * * *